United States Patent [19]
Wechsberg et al.

[11] Patent Number: 4,814,773
[45] Date of Patent: Mar. 21, 1989

[54] FIBER OPTIC FEED NETWORK FOR RADAR

[75] Inventors: Michael Wechsberg, Westminster; Adrian E. Popa, Newbury Park, both of Calif.

[73] Assignee: Hughes Aircraft Company, Los Angeles, Calif.

[21] Appl. No.: 493,453

[22] Filed: May 11, 1983

[51] Int. Cl.⁴ .............................................. H01Q 3/22
[52] U.S. Cl. .................................... 342/368; 342/371
[58] Field of Search ..................... 343/16 R, 9 PS; 342/368, 371, 372, 52, 175

[56] References Cited

U.S. PATENT DOCUMENTS

| | | | |
|---|---|---|---|
| 3,205,495 | 9/1965 | Wilmotte | 343/16 R |
| 3,878,520 | 4/1975 | Wright et al. | 343/368 |
| 4,258,363 | 3/1981 | Bodmer et al. | 343/16 R |
| 4,330,876 | 5/1982 | Johnson | 343/16 R X |
| 4,529,986 | 7/1985 | d'Auria et al. | 342/433 X |

OTHER PUBLICATIONS

George M. Dillard, "Radar Signal Processing Using Fiber and Integrated Optics", Conference: Radar, 1977, pp. 363–367, London, England.
Arnold M. Levine, "Use of Fiber Optic Frequency and Phase Determining Elements in Radar", Conference: Proc. 33rd Annual Symposium on Freq. Control, Atlantic City, N.J., 1979, pp. 436–443.

Primary Examiner—Thomas H. Tarcza
Assistant Examiner—John B. Sotomayor
Attorney, Agent, or Firm—Thomas A. Runk; A. W. Karambelas

[57] ABSTRACT

In a radar having electrical transmitting and receiving circuitry, and an antenna for the radiation of microwave signals, there is provided an optical feed system which couples the antenna with the transmitting and receiving circuitry. The feed system includes a set of optical multiplexers interconnected by sets of optical fibers. Microwave energy of the radar is converted to optical radiation for communication to the antenna, and then converted back to the microwave energy. Electro-optic modulators and photoelectric detectors provide for the energy conversion. A plurality of signals, including both signals having the transmit waveform as well as control signals, can be simultaneously coupled via the optical fibers by utilization of radiation of differing frequencies. The multiplexers include dichroic mirrors for separation of the radiations of the differing frequencies. The fiber optic feed system retains the full beam steering capacity of the radar and permits the use of conventional electronic circuitry with the feed network of the optical feed system.

20 Claims, 3 Drawing Sheets

FIBER OPTIC FEED NETWORK FOR RADAR

The Government has rights in this invention pursuant to Contract No. F30602-81-C-0051 awarded by the Department of the Air Force.

BACKGROUND OF THE INVENTION

This invention relates to feed networks for electronically scanned radars and, more particularly, to a feed network constructed of optical fibers.

Electronically scanned radars are widely used in both fixed and mobile installations. Such radars include a feed network which couples microwave energy from the transmitter to a radiating aperture of the antenna, as well as from the aperture to the receiver. Feed networks are constructed in a variety of forms, with the corporate feed being particularly useful in providing an accurate distribution of microwave energy across the radiating aperture.

A problem arises in that such feed networks, particularly the corporate feed, introduced weight and bulk to the radar antenna, a clear disadvantage in mobile applications which call for reduced weight and bulk. Furthermore, such feed networks are limited in their effectiveness by factors including electromagnetic interference, cross talk, transmission loss, and bandwidth limitations. Thus, existing feed networks place constraints on radars both in terms of their deployment and in terms of their electrical characteristics.

SUMMARY OF THE INVENTION

The aforementioned problems are overcome and other advantages are provided by a feed system for a radar antenna which, in accordance with the invention, incorporates fiber-optic transmission lines. Such transmission lines have sufficiently low loss to permit the antenna aperture to be located at a distance from other components of the radar, such as the transmitter and the receiver, thereby providing greater freedom in the design of the radar. The fiber-optic transmission lines retain the full beamsteering capacity of the radar since conventional microwave delay lines and phase shifters can be employed. If desired, programmable optical delay lines, presently under development, can be utilized in the feed system. Such optical elements are smaller and lighter than their microwave counterparts and, accordingly, offer further savings in space and weight.

Implementation of the invention is accomplished by conversion of microwave energy to optical radiation, and back to microwave energy. Thereby, the usual signal-processing operations involving microwave signals can be retained. Electro-optic modulators are employed for impressing the modulation of the microwave signals on the optical signals. Photo-electric detectors retrieve the modulation. The invention further incorporates optical multiplexing to permit several signals to pass along a single optical fiber. This reduces the number of fibers required and balances the optical path lengths for transmission and reception.

BRIEF DESCRIPTION OF THE DRAWINGS

The foregoing aspects and other features of the invention are explained in the following description taken in connection with the accompanying drawing wherein.

DETAILED DESCRIPTION OF THE INVENTION

Figure 1:
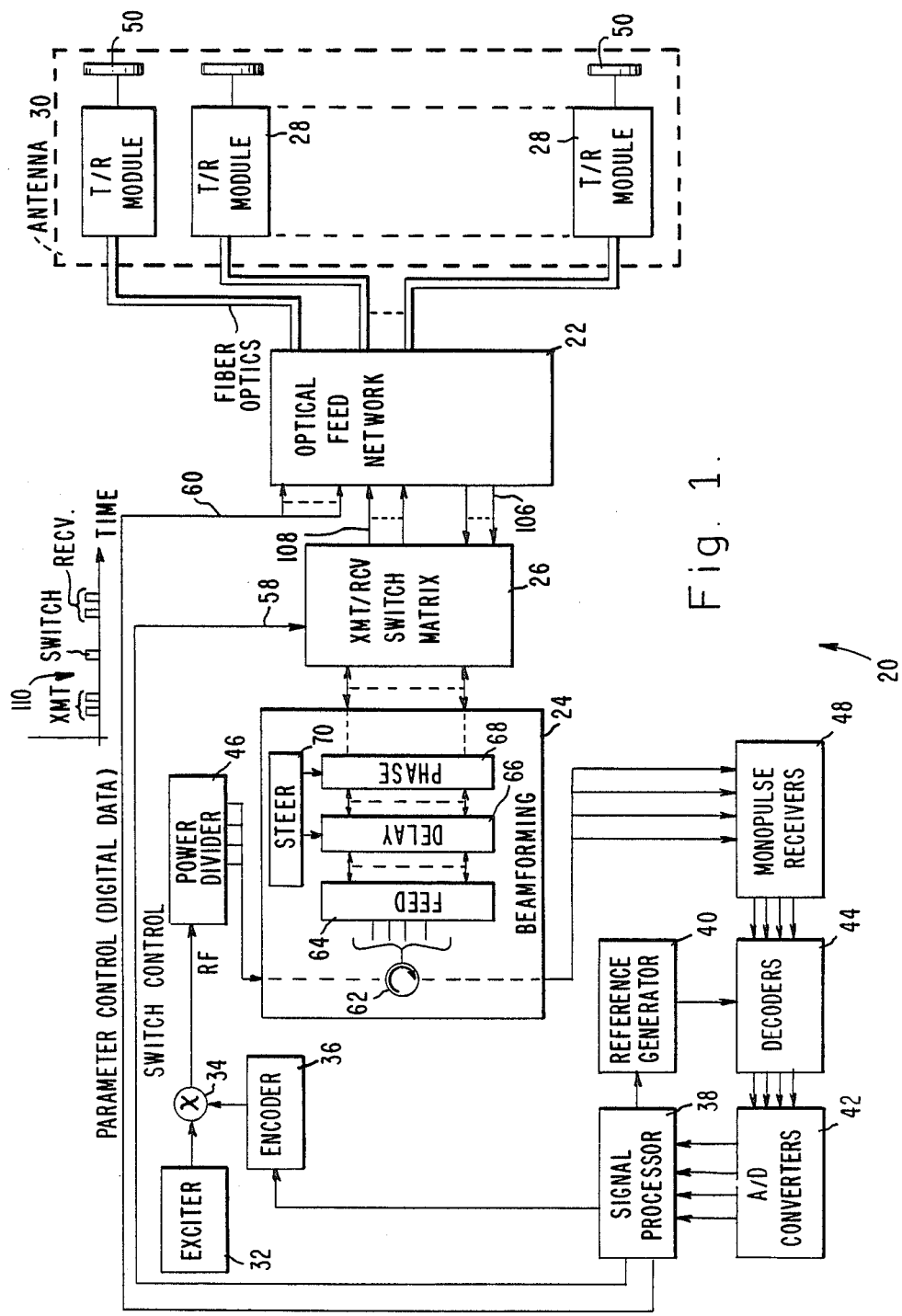
FIG. 1 is a block diagram of an electrically scanned radar incorporating an optical feed network in accordance with the invention.

FIG. 1 shows an electronically-scanned radar system 20 which incorporates an optical feed network 22 which connects a microwave beamforming network 24 through a switch matrix 26 to a set of transmit/receive modules 28 in an antenna 30. In accordance with a feature of the invention, the optical feed network 22 provides for the coupling of both the transmitter signal and the received signal, optically, between the beamforming network 24 and the antenna 30. In addition, digital signals utilized in the control of the modules 28 are also converted to optical signals for connection, by the feed network 22, to the respective ones of the modules 28.

In accordance with the invention, the feed network 22 may be incorporated into radar systems of various configurations and, accordingly, the radar system 20 serves as one example of a suitable system for incorporation of the invention. The system 20 comprises components which are well known in the design of radar systems, these components being an exciter 32, a modulator 34 and encoder 36, a signal processor 38, a generator 40 of reference signals, a set of analog-to-digital converters 42, a set of decoders 44, a power divider 46 and a set of monopulse receivers 48. The antenna 30 comprises a set of radiating elements 50, such as dipole radiators, each of which is coupled to a corresponding one of the modules 28.

In operation, the exciter 32 provides an RF (radio frequency) signal which is modulated by the modulator 34 with a suitable radar signal waveform provided by an output signal of the encoder 36. The signal processor 38 drives the encoder 36 to provide the radar signal waveform. The output signal of the modulator 34 is applied to the power divider 46 which divides the power of the RF signal equally among four channels which connect with the beamforming network 24. The network 24 is connected via the switch matrix 26 to any one of four sections of the antenna 30 for the generation of transmitted beams and receiving beams by the four sections of the antenna 30. Each of these sections comprises a set of the radiating elements 50. The matrix switch 26 is operated by a signal on line 58 provided by signal processor 38. Thereby, the signal processor 38 designates the section of the antenna 30 from which a beam is to be generated.

Both the transmitted signal and the received signal pass through the beamforming network 24 and the switch matrix 26. The transmitted signal enters the beamforming networks 24 by the respective output channels of the power divider 46. The received signal exits the beamforming network 24 via four channels to the set of four monopulse receivers 48. The monopulse receivers 48 are utilized, in a well known manner, for the amplification, filtering, and the generation of beam-pointing signals in the determination of the angular orientation of a target relative to the axis of the antenna 30. The signals received by the receivers 48 include the coding inserted by the encoder 36 and the modulator 34, the received signals being decoded by the decoders 44 with the aid of reference signals provided by the generator 40. The appropriate reference signals are attained with the aid of the signal processor 38 which drives the generator 40. The output signals of the decoders 44 are in analog format and, accordingly, are converted by the converters 42 to digital format which is suitable for use by the processing operations of the signal processor 38. Target ranging based on the elapsed time from transmission to reception is also accomplished by the signal processor 38.

As will be described subsequently, each of the modules 28 includes a gain-control circuit for varying the intensity of the transmitted signal and for varying the gain of the received signal. In particular, it is noted that it is common practice in radar design to vary the amplitude of the signals radiated by individual ones of the radiating elements 50, the variation being accomplished across the radiating aperture of the antenna 30 to provide for an intensity distribution which provides a desired shape to the transmitted beam. These parameters are controlled by the aforementioned digital data, shown on line 60, which control signals are produced by the signal processor 38. As has already been noted, these digital control signals are converted from electrical form to optical form at the feed network 22, whereupon they are distributed via fiber optics to respective ones of the modules 28. Thereby, the modules 28 can apply the desired amount of signal strength to respective ones of the radiating elements. Also, as will be described hereinafter, the feed network 22 comprises multiplexers which enable a single optical fiber to carry a transmitted signal, a received signal and a control signal wherein each of these signals are supported by a carrier optical signals of differing frequencies.

The invention thus provides for the substitution of fiber optics for the waveguide or coaxial structures that have been used to feed the antenna. However, the invention permits the beamforming to be accomplished with conventional microwave components in conjunction with beamswitching, such as azimuthal beamswitching. On transmit, the switching matrix provides the RF from the exciter to a bank of optical modulators as will be described with reference to FIG. 2, there being one modulator in each of a plurality of channels of the feed network 22, and the switch matrix 26 selects the portion of the array of the radiating elements 50 to be boresighted on the azimuth (or elevation) of interest. The modulators are used to intensity-modulate light with the RF signal, the modulated light then being routed over the fiber optic links of the feed network 22 to the modules 28. On receive, signals pass through the same optical fibers to be converted back to RF signals which are then routed through the switch matrix 26 to the beamforming networks 24. With respect to the four output beams generated by the system 20, it is understood that each of these beam signals may be separately processed by conventional circuitry, such as pulse compression networks, which may be included within the receivers 48. The provision for the four beams is accomplished by the power divider 46 and the feed 64 which may incorporate a Butler matrix or other form of lens. In the simplified drawing of the beamforming network 24 in FIG. 1, the network 24 is shown to comprise a set of circulators represented by the circulator 62, each of which has a port connected to a multi-beam feed 64.

The circulators 62 provide connection between the output channels of the power divider 46, the corresponding feed 64, and the corresponding input channels of the set of monopulse receivers 48. Also shown are a set of delay lines 66 and set of phase shifters 68 for imparting delays among the signals associated with each of the radiating elements 50. Thus, the delay lines 66 may be utilized to provide for large increments of delay while the phase shifters 68 may be utilized for trimming the phase to provide small corrections in delay. By use of variable delay lines under control of a beamsteering unit 70, the resulting beams may be steered to a desired location in accordance with well-known beamsteering techniques. In the coupling of the signals from the beamforming network 24 to the feed network 22, it is noted that the switches (not shown) therein are ganged in two groups corresponding to two separate signal paths for transmit and receive. Since the circuitry employs relatively low power levels, the switching in the matrix 26 can be accomplished by all-electronic devices utilizing well-known integrated technology.

Figure 2:
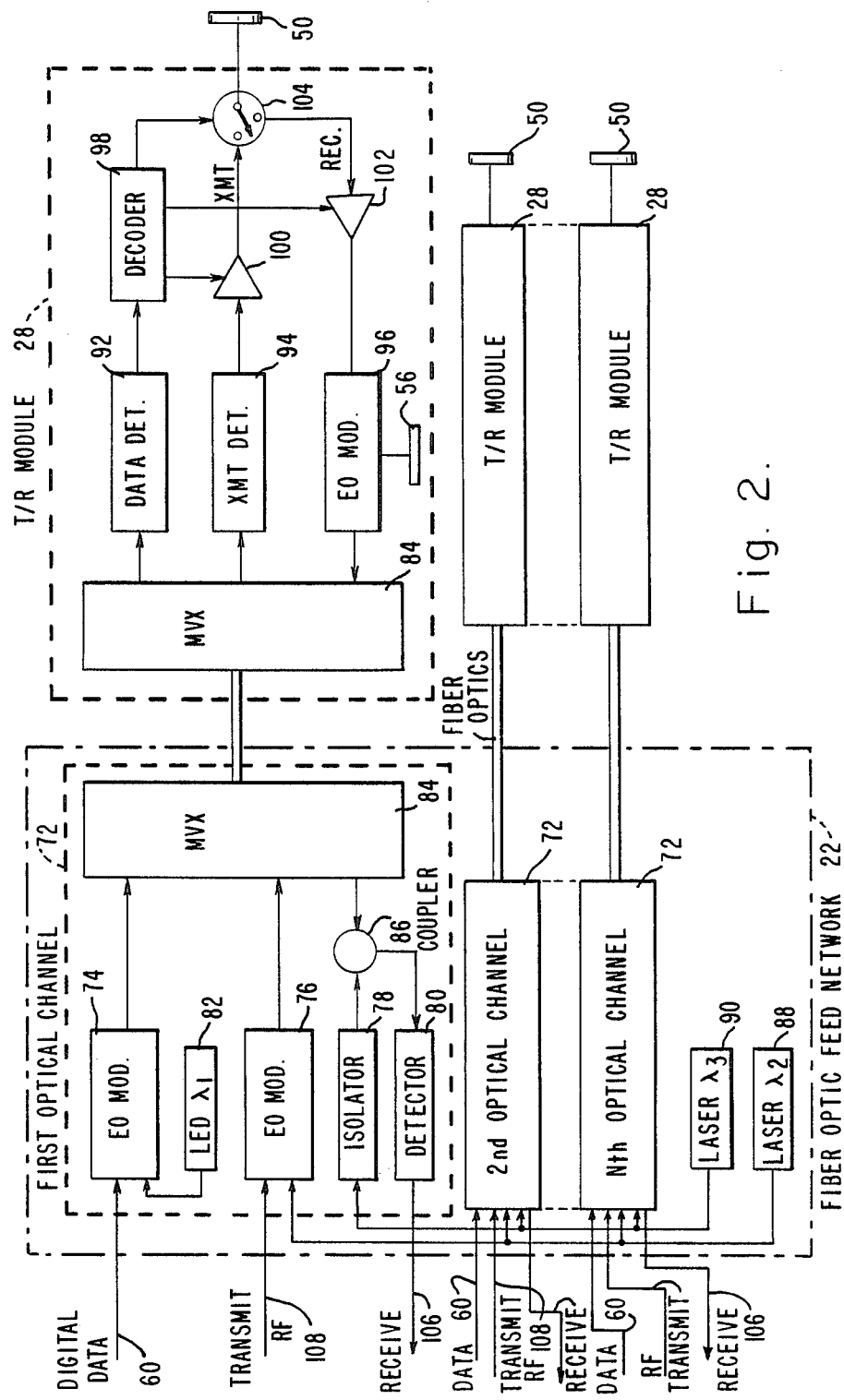
FIG. 2 is a block diagram of optical circuits of the feed network of FIG. 1.

With reference now to FIG. 2, the optical feed network 22 comprises a set of channels 72 each of which comprises electro-optic modulators 74 and 76, an optical isolator 78, a photodetector 80, a light-emitting diode 82, an optical multiplexer 84, and an optical coupler 86. The network 22 further comprises two lasers 88 and 90. The radiations produced by the diode 82, and the lasers 88 and 90 differ in wavelength so as to permit their propagation along selected paths within the multiplexer 84, which will be described with reference to FIG. 3. Typical values of wavelength are disclosed in FIG. 3.

Each of the modules 28 is connected by an optical fiber to a corresponding one of the channels 72. Each module 28 comprises a multiplexer 84, photodetectors 92 and 94, an electro-optic modulator 96, a decoder 98, gain-controlled amplifiers 100 and 102, a microwave switch 104, and a mirror 56. Also shown in FIG. 2 are the radiating elements 50 connecting with the modules 28.

In operation, each of the channels 72 connects with switches of the matrix 26 of FIG. 1 by means of the receive lines 106 and the transmit lines 108. Digital data for the parameter control is coupled via line 60 to the switch 22, the line 60 fanning out into the individual lines which couples specific data instructions to each channel 72 for communication to the corresponding module 28. The signal on line 60 provides for the control of the gain of the amplifier 100 for transmission of an RF signal, the gain of the amplifier 102 for reception of an RF signal, and operation of the electronic switch 104 for connection of the radiating element 50 either to the transmit line from the amplifier 100 or to the receiver line to the amplifier 102. These functions are incorporated into the signal on line 60 by a time-division multiplexing of digital data for each of these functions as is portrayed in the graph 110, placed adjacent the line 60 in FIG. 1. The graph 110 portrays the signals for one of the modules 28, it being understood that other signals of similar format would be coupled via other ones of the lines fanning out from the line 60 to the other ones of the modules 28.

For transmission, the transmit signal on line 108, for each of the channels 72, is applied to the modulating terminal of the modulator 76 to modulate the light of the laser 88 with the waveform of the electrical transmit signal on line 108. The laser 88 is coupled to the modulator 76 in each of the channels 72. Thus, in each of the channels 72, the multiplexer 84 receives light of the laser 88 at one of its input terminals, the light carrying a modulation pattern corresponding to the transmit signal. With respect to the conversion of the control signal of line 60, the modulator 74 is utilized in conjunction with the light-emitting diode 82 in each channel 72. The modulator 74 modulates the light of the diode 82 with the waveform of the digital data signal on line 60, and applies the modulated light to an input terminal of multiplexer 84. Further details of the operation of the multiplexer 84 are described with reference to FIG. 3.

The output terminal of the multiplexer 84 of a channel 72 in the network 22 is coupled via the optical fiber to an input terminal of the multiplexer 84 in the corresponding module 28. At one output terminal of the multiplexer 84 in the module 28, the optical signal carrying the digital data is applied to the detector 92 which converts the optical signal to an electrical signal having the same form as the electrical signal on line 60 at the input to the modulator 74. At a second output terminal of the multiplexer 84 in the module 28, the optical signal carrying the transmit waveform is applied to the photodetector 94 which converts the optical signal to an electrical signal having the same form as the corresponding signal on line 108 at the input to the modulator 76. The decoder 98 decodes the signal waveform, as presented in the graph 110 of FIG. 1, to provide the gain control signals for the amplifiers 100 and 102 as well as the switch control signal for the switch 104. During transmission, the switch 104 is operated so as to couple the output terminal of the amplifier 100 to the radiating element 50. During reception, the switch 104 is operated by the decoder 98 to couple the input terminal of the amplifier 102 to the radiating element 50. Thereby, the transmit signal at the detector 94 is amplified by the amplifier 100 and is applied via the switch 104 to the radiating element 50. During reception, the radiating element 50 applies received signals via the switch 104 to the input terminal of the amplifier 102. The amplifier 102 amplifies the received signal and applies the amplified received signal to the modulating input terminal of the modulator 96. Typically, the output power of the amplifier 100 is in the range of from one to ten watts with approximately 30 dB of gain control. Variations of the gain control among the respective modules 28 provides for an amplitude taper to the illuminating function of the radiating aperture of the antenna 30. The amplifier 102 is preferably of a low-noise type having approximately 20 dB of gain with noise figure of less than 3 dB and a dynamic range capability of 30 dB or greater.

The modulator 96 in the module 28 operates in the same fashion as does the modulator 76 in the channel 72 of the feed network 22. Accordingly, a light beam from the laser 90 is modulated by the modulator 96 with the waveform of the received signal. The modulated optical signal is applied by the modulator 96 to an input terminal of the multiplexer 84 to be transmitted via the optical fiber to the multiplexer 84 in channel 72. At an output terminal of the multiplexer 84 in the channel 72, the received optical signal is applied to the coupler 86 wherein the received optical signal is routed to the detector 80. The signal of the laser 90 is applied via the isolator 78 to the coupler 86, the coupler 86 providing for the flow of optical power in only one direction, this being from the laser 90 to the multiplexer 84, and the isolator 78 providing for the protection of the laser 90 from any residual light flowing in the opposite direction. The detector 80 converts the two optical signals carrying the receive waveform to an electrical signal which it applies to line 106. The foregoing process occurs with each module 28 and its corresonding channel 72 in the feed network 22.

The use of the mirror 56 on the module 28 provides for the reflection of the light from the laser 90 back to the detector 80. In an alternative embodiment, the mirror 56 on each module 28 may be replaced with a laser diode operating at the same wavelength as laser 90. In this case, the coupler 86, isolator 78 and laser 90 could be eliminated without otherwise affecting operation of the optical feed network 22.

Figure 3:
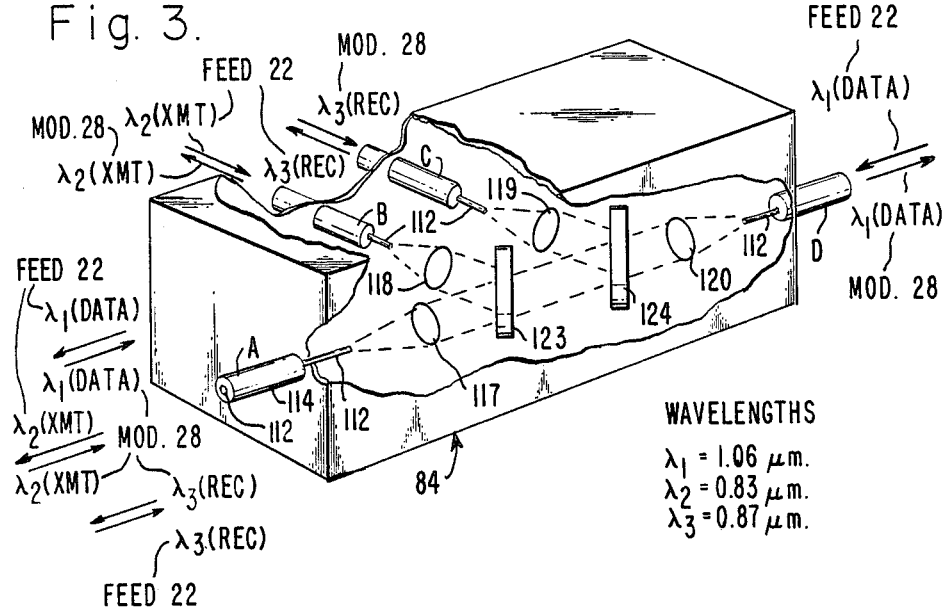
FIG. 3 shows a detailed view of a multiplexer of FIG. 2.

With reference to FIG. 3, there is provided a more detailed view of the construction of the multiplexer 84 utilized in each of the channels 72 and in each of the modules 28. The multiplexer 84 has four ports identified by the letters A, B, C and D. Each of these ports have the form of fiber optic cable comprising a glass filter 112 enclosed by a cladding 114. As is well known, the indices of refraction are chosen to provide for internal reflection of light rays within the fiber 112. The fibers 112 extend toward microlenses 117-120 which collimate the rays of light and are optically coupled via dichroic mirrors 123-124.

The wavelength of the respective radiations entering and exiting from the ports A–D are identified in the figure. The identifications are made for the location of a multiplexer 84 in a channel 72 of the feed network 22, and also for the location of a multiplexer 84 in a module 28. These identifications are indicated in FIG. 3. Thus, by way of example, at feed network 22, the data enters at port D while the transmit signals exit at port B. Both the data and the transmit signals exit at port A. The received signal enters at port A and exits at port C. As a further example, the multiplexer 84 at a module 28, the transmit and data signals enter at port A and exit respectively at ports B and D. The received signal enters at port C and exits at port A.

The progagation paths of the radiations of the various wavelengths proceeds straight through a dichroic mirror or is deflected by a dichroic mirror, such as the mirrors 123 and 124, depending on the magnitude of the wavelength. Thus, at the longest wavelength, this being the data signal, no deflection takes place at either of the dichroic mirrors 123-124. Thus, as may be seen by inspection of FIG. 3, the data signal both enters and exits via ports A and D which are arranged in a straight line. In contrast, the mirror 123 is provided with a coating having the requisite thickness and index of refraction to deflect the shorter wavelength, this being the wavelength of the transmit signal. The mirror 124 is provided with a coating having the requisite thickness and index of refraction to deflect the received signal. Thereby, the multiplexer 84 is responsive to the frequencies of the respective radiations so as to dispense the respective signals via their respective ports.

With respect to details of the construction of the multiplexer 84, multilayer dielectric coatings are utilized in the dichroic mirrors 123-124. The entire multiplexer 84 may be fabricated in a single block of glass. The technology of selecting and applying the requisite coatings is known, such data appearing in a set of articles in the "Technical Digest of the Sixth Topical Meeting on Optical Fiber Communication of the IEEE in New Orleans", 28 Feb.-2 Mar. 1983. These papers were presented by researchers at the Bell Telephone Laboratories. Thus, the same multiplexer may be utilized for both incoming and outgoing optical signals and, furthermore, the same for of multiplexer may be utilized in both a channel 72 and in its corresponding module 28.

Figure 4:
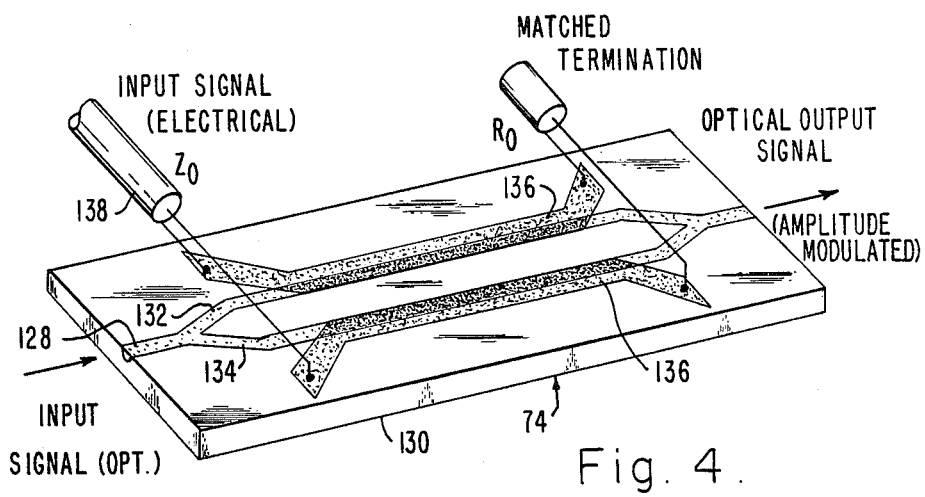
FIG. 4 shows a detailed view of an electro-optic modulator of FIG. 2.

FIG. 4 shows a detailed view of the electro-optic modulator 74, the modulators 76 and 96 being of the same construction. A bifurcated optical waveguide 128 is formed within a glass block 130. Optical radiation entering the waveguide 128 splits between paths 132 and 134 of equal length, the two paths 132 and 134 rejoining at the output port of the modulator 74. A pair of electrodes 136 are disposed over the paths 132 and 134 to provide an electrical structure supportive of a traveling electromagnetic wave. The input electric signal is fed via an electric line 138 presenting an input impedance equal to that of the structure of the electrodes 136. The structure of the electrodes 136 is terminated by a matched impedance which absorbs all traveling waves and thereby prevents reflection at the end of the structure of the electrodes 136.

As the input electric signal travels down the electrode 136, the wave interacts with the glass utilized in the fabrication of the waveguide 128 resulting in a change in its index of refraction. As a result of the shift in the index of refraction, the propagation speed of the optical radiation is altered with the result that a difference in phase arises between the radition propagating down the two branches such that the radiation in the path 134 differs in phase from the radiation in the path 132. Accordingly, after the output port, there is interference between the radiation propagating along the two branches, which interference provides for addition or subtraction of the two radiation signals to provide for a reduction or increase in amplitude. Thereby, the amplitude of the radiation at the output port of the modulator 74 is based on the magnitude of the input electric signal. Thereby, the modulator 74 modulates an input optical signal with the waveform of an input electric signal to provide an amplitude modulated output optical signal.

It is to be understood that the above described embodiments of the invention are illustrative only and that modifications thereof may occur to those skilled in the art. Accordingly, this invention is not to be regarded as limited to the embodiment disclosed herein, but is to be limited as defined by the appended claims.

What is claimed is:

1. In a radar having electrical transmitting and receiving circuitry and a phased array antenna having a plurality of radiating elements for the radiation of microwave signals, a feed system coupling the antenna with the transmitting and receiving circuitry, the feed system comprising:
    beamforming means for processing microwave signals to steer the antenna beam and making those signals available at a plurality of input/output ports;
    a plurality of optical fibers, each of which is for exclusively coupling signals between a particular input/output port of the beamforming means and a particular radiating element of the antenna;
    multiplexing means at opposite ends of each of said fibers for two-way communication of optical signals;
    a plurality of electro-optic modulating means one each coupled to input terminals of said multiplexing means for applying optical signals modulated by an electric waveform;
    a plurality of photoelectric detecting means one each coupled to output ports of said multiplexing means for detecting electric waveforms in an optical signal applied to the multiplexing means; and
    sources of optical radiation, said sources differing in frequency and being coupled to respective input ports of said modulating means to permit separation of respective ones of optical signals applied to said optical fibers by said multiplexing means, and wherein said modulating means connecting with said input/output ports of said beamforming means for modulating optical radiation with transmit signals, said photoelectric detecting means connecting with elements of said antenna for exciting said elements with electric signals having the transmit waveform.

2. A system according to claim 1 further comprising a connection of said modulating means with said antenna elements and a connection of said photoelectric detecting means with said beamforming means to provide for the coupling of received signals at said antenna, via said feed system, to said receiving circuitry.

3. A system according to claim 2 wherein said multiplexing means comprise a set of dichroic mirrors for deflecting beams of radiation at specific frequencies of radiation, thereby separating a plurality of optical signals propagating along a single fiber to appear at respective ones of output ports of said multiplexing means.

4. A system according to claim 3 wherein said sources of optical radiation provide for three different frequencies of optical radiation.

5. A system according to claim 1 wherein said multiplexing means includes a port for communication of digital data and wherein said antenna includes amplifiers coupled to radiating elements of said antenna, said amplifiers being gain controlled in response to said digital data, and wherein said radar includes circuitry for generation of such digital data.

6. In an electronically steerable phased array radar having a beamformer with input/output ports and an antenna, the beamformer for processing microwave signals including means for delaying signals coupled to individual radiators of the antenna, an optical feed system for coupling signals from the beamformer to the antenna, the optical feed system comprising:
    a set of optical transmission paths connecting respective input/output ports of the beamformer with respective ones of the antenna radiators;
    a plurality of first converting means one each connected between respective input/output beamformer ports and said respective transmission paths for converting electric signals of said beamformer to optical signals, said optical signals propagating along said respective transmission paths toward said antenna; and
    a plurality of second converting means one each connected between said respective antenna radiators and said respective transmission paths for converting optical signals to electric signals, for radiation from said radiators as the radar transmitted signal.

7. A system according to claim 6 wherein said first converting means includes plural sources of optical radiation at differing frequencies.

8. In an electronically steerable array antenna having a beamformer for processing microwave signals which is spaced apart from radiating elements of the antenna, an optical feed system for coupling signals between said beamformer to said radiating elements comprising:

a set of optical transmission paths disposed between said beamformer and said radiating elements for exclusively coupling respective input/output ports of the beamformer to respective radiating elements;

a plurality of multiplexing means one each connecting with said set of optical transmission paths for providing two-way transmission of optical signals along said transmission path; and a plurality of converting means one each coupled to said transmission paths for providing a conversion between optical energy and electric energy whereby electric signals of said beamformer and said respective radiating elements can be converted to optical signals for transmission along said transmission paths followed by conversion back to electric signals.

9. A system according to claim 8 wherein said converting means includes means for producing beams of optical radiation at different frequencies, and means for selectively modulating individual ones of said electric signals on individual ones of said beams having different frequencies of radiation.

10. A system according to claim 9 wherein said transmission paths comprise optical fibers, and said multiplexing means includes a plurality of input ports each of which is responsive to optical radiation at a predesignated one of said frequencies for coupling a plurality of signals of said beamformer to one of said fibers for simultaneous transmission along said fiber.

11. A system according to claim 6 wherein:
the optical feed system is also for coupling signals from the antenna to the beamformer;
the first converting means is also for converting optical signals received from the antenna along the optical transmission paths to electric signals for processing by the beamformer; and
the second converting means is also for converting electric signals received from the antenna to optical signals for transmission along the optical transmission paths.

12. In a radar system having electrical transmitting and receiving circuitry and a phased array antenna in which the plurality of radiating elements are connected to respective transmit/receive modules, a feed system coupling the transmit/receive modules with the transmitting and receiving circuitry comprising:
beamforming means for processing microwave transmit and received signals to steer the antenna beam and making the processed transmit signals available at a plurality of input/output ports;
a plurality of optical fibers, each of which is for exclusively coupling signals between a particular input/output port of the beamforing means and a particular transmit/receive module;
optical source means for producing optical radiation for conduction by the plurality of optical fibers;
a plurality of electro-optic modulating means, each of which is for coupling an optical fiber to the optical radiation and for modulating that radiation by applying the processed transmit signal from the respective input/output port of the beamforming means thereto; and
a plurality of photoelectric detecting means, each of which is coupled to a respective optical fiber, for detecting electrical transmit signals in an optical signal conducted by the optical fibers and applying the detected transmit signals to the respective transmit/receive module.

13. The feed system of claim 12 wherein:
the beamforming means receives received signals at the plurality of input/output ports;
the plurality of electro-optic modulating means are also for modulating the optical radiation conducted by the optical fibers by applying the received signals from the respective transmit/receive module thereto; and
the plurality of photoelectric detecting means are also for detecting electrical received signals in the optical signals conducted by the optical fibers and applying the detected electrical received signals to the respective input/output port of the beamforming means.

14. The feed system of claim 12 further comprising:
multiplexing means at opposite ends of each of the optical fibers for multiplexing optical signals conducted by the fibers; and
the optical source means comprises a plurality of radiation sources having different frequencies and which are coupled to respective input ports of said electro-optic modulating means to permit separation of respective ones of optical signals applied to said optical fibers by said multiplexing means.

15. The feed system of claim 14 wherein said multiplexing means comprises a set of dichroic mirrors for deflecting beams of radiation at specific frequencies of radiation, thereby separating a plurality of optical signals propagating along a single fiber to appear at respective ones of output ports of said multiplexing means.

16. The feed system of claim 14 wherein said optical source means provides for three different frequencies of optical radiation.

17. The feed system of claim 14 wherein said multiplexing means includes a port for communication of digital data and wherein said antenna includes amplifiers coupled to radiating elements of said antenna, said amplifiers being gain controlled in response to said digital data, and wherein said radar includes circuitry for generation of such digital data.

18. In a radar system having electrical receiving circuitry and a phased array antenna in which the plurality of radiating elements are connected to respective transmit/receive modules, a feed system coupling the transmit/receive modules with the receiving circuitry comprising:
beamforming means for processing microwave received signals to steer the antenna beam and for receiving the received signals at a plurality of input/output ports;
a plurality of optical fibers, each of which is for exclusively coupling signals between a particular input/output port of the beamforming means and a particular transmit/receive module;
optical source means for producing optical radiation for conduction by th plurality of optical fibers;
a plurality of electro-optic modulating means, each of which is for coupling an optical fiber to the optical radiation and for modulating that radiation by applying the received signal from the respective transmit/receive module thereto; and
a plurality of photoelectric detecting means, each of which is coupled to a respective optical fiber, for detecting electrical received signals in an optical signal conducted by the optical fibers and applying the detected received signals to the respective input/output port of the beamforming means.

19. The feed system of claim 18 further comprising:

multiplexing means at opposite ends of each of the optical fibers for multiplexing optical signals conducted by the fibers; and the optical source means comprises a plurality of radiation sources having different frequencies and which are coupled to respective input ports of said electro-optic modulating means to permit separation of respective ones of optical signals applied to said optical fibers by said multiplexing means.

20. The feed system of claim 18 wherein said multiplexing means includes a port for communication of digital data and wherein said antenna includes amplifiers coupled to radiating elements of said antenna, said amplifiers being gain controlled in response to said digital data, and wherein said radar includes circuitry for generation of such digital data.

* * * * *